Dec. 26, 1944.  R. L. HIBBARD  2,365,820
MACHINE TOOL
Filed Dec. 30, 1942  3 Sheets-Sheet 1
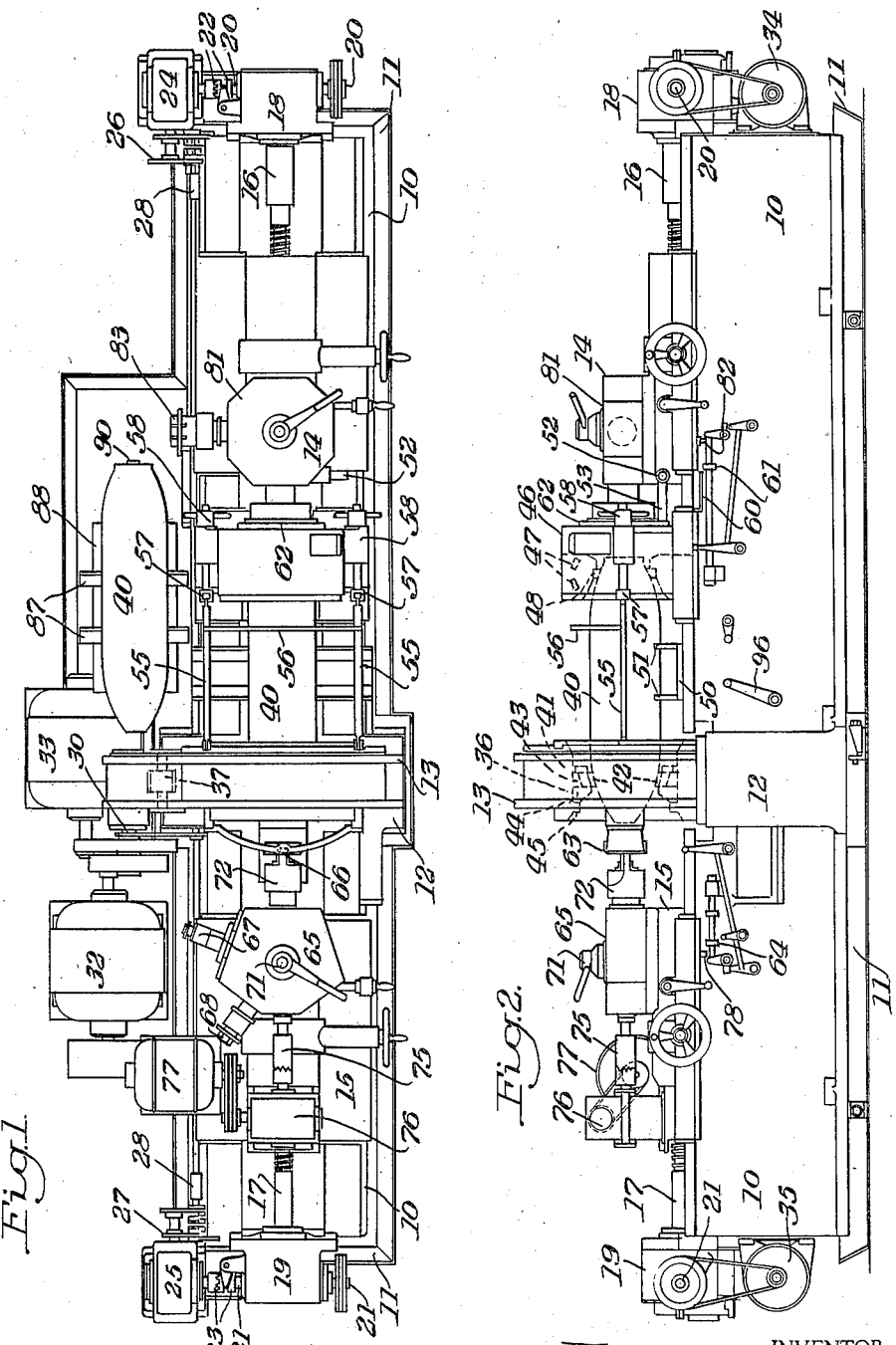
INVENTOR.
Robert L. Hibbard
BY Edward R. Lawrence
his attorney.

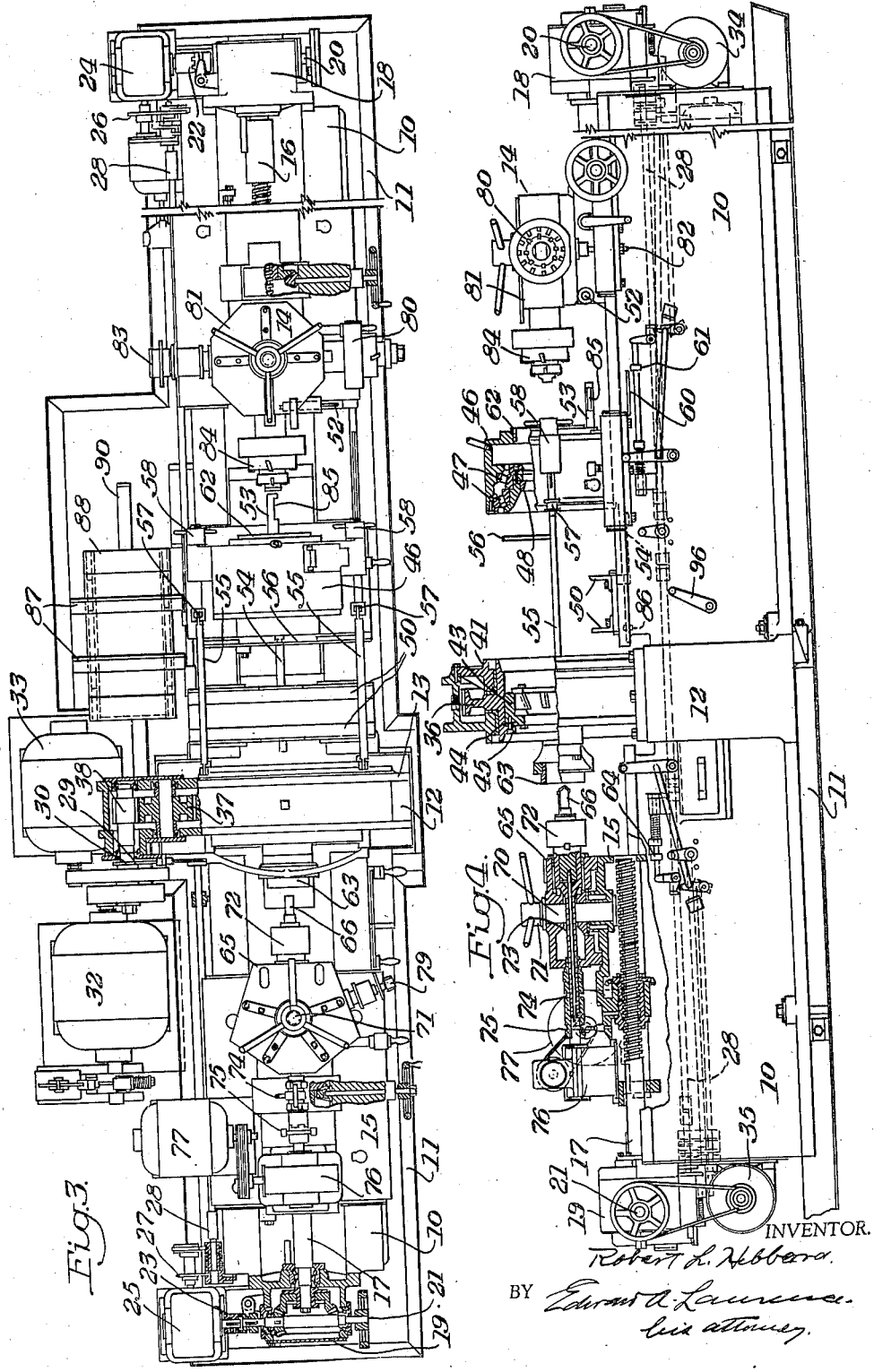

INVENTOR.
Robert L. Hibbard.
BY Edward A. Lawrence
his attorney.

Patented Dec. 26, 1944

2,365,820

UNITED STATES PATENT OFFICE 2,365,820

MACHINE TOOL

Robert L. Hibbard, Bellevue, Pa., assignor of one-half to William K. Stamets, Mars, Pa.; Stewart C. Hibbard, Robert L. Hibbard, Jr., and Hays M. Junkin, executors of said Robert L. Hibbard, deceased Application December 30, 1942, Serial No. 470,541

19 Claims. (Cl. 29—27)

This invention relates generally to metal working and more particularly to apparatus for boring and threading the nose and tail of tubular bodies such as bombs.

The principal object of this invention is the provision of a metal working production machine that will load, machine and discharge a bomb.

Another object is the provision of a lathe in which a bomb is rotatably supported and driven in both directions for boring and threading the ends thereof.

Another object is the provision of a lathe having rotatably mounted jaws or grips in spaced relation which receive a bomb case therebetween to impart rotary motion thereto for the purpose of machining the same.

Another object is the provision of a lathe having two sets of jaws or grips rotatably mounted in spaced rests which have relative movement toward and away from one another to automatically chuck and lock a bomb case therebetween for the purpose of machining the ends thereof.

Another object is the provision of a lathe having a turret which supports a plurality of tools with a shaft passing transversely through the turret for rotatably driving one of the tools.

Another object is the provision of a bomb tipping mechanism for discharging the cutting lubricant and borings from the interior of the bomb.

Another object is the provision of a power chucking apparatus for clamping the work piece under a predetermined pressure.

Another object is the provision of apparatus for selectively controlling the slow or rapid traverse of carriages on ways of a lathe under forward or reverse drive conditions.

Another object is the provision of a machine tool which rotates the work piece at a predetermined speed permitting simultaneous boring at both ends thereof with one bore requiring a different relative speed between the tool and the work than the other bore.

Another object is the provision of a machine for tapping bored holes of different diameters with right and left hand threads requiring different directions of rotation at different speeds.

Another object is the provision of a chuck for receiving and rotatably holding a work piece under heavy end thrust pressures.

Other objects and advantages appear in the following description and claims.

A practical embodiment illustrating the principles of this invention is shown in the accompanying drawings wherein:

Fig. 1 is a top plan view of the machine tool comprising this invention with the work piece in machining position.

Fig. 2 is a side elevation of the machine shown in Fig. 1.

Fig. 3 is a view similar to Fig. 1 with the machine parts shown in their retracted position.

Fig. 4 is a view in side elevation of the structure shown in Fig. 3.

Figure 5:
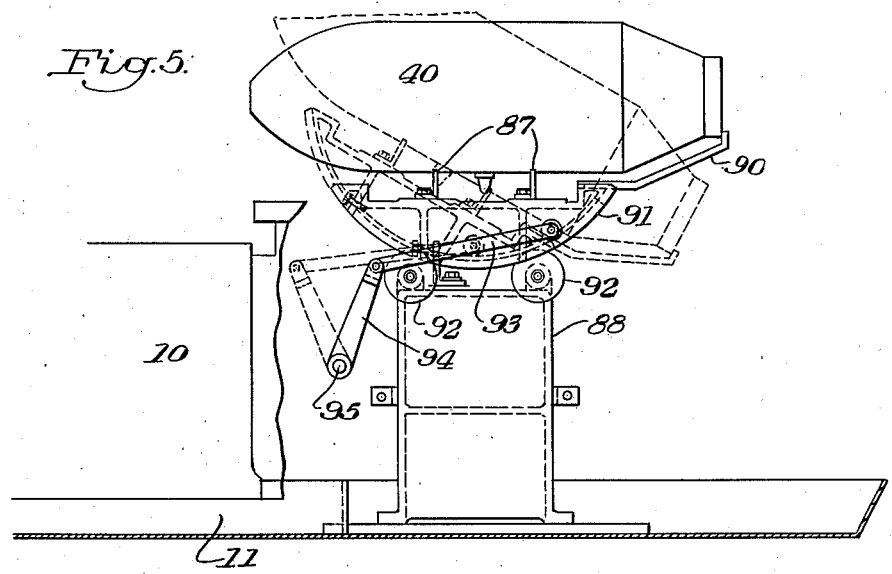
Fig. 5 is a view in side elevation of the bomb tilting apparatus with parts omitted or broken away.
Figure 6:
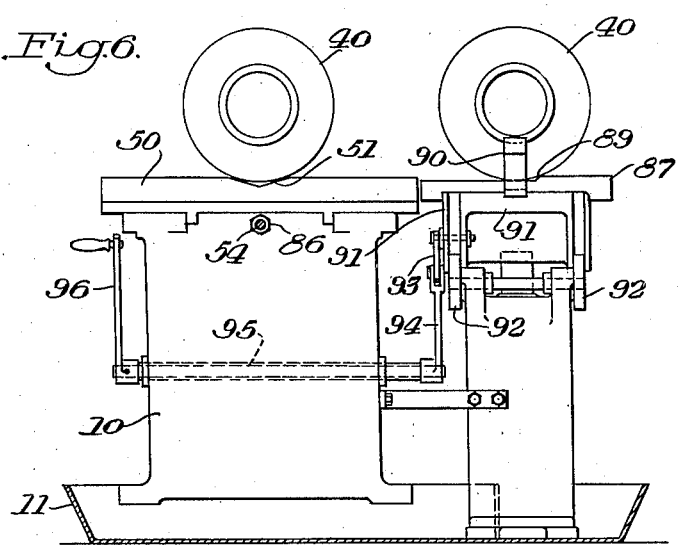
Fig. 6 is an end view of the bomb tilting apparatus and a portion of the machine tool with parts omitted or broken away.

Referring principally to Figs. 1 to 4 of the drawings, 10 represents the machine bed mounted in the lubricant drip pan 11 which catches and retains the lubricant so that it may be strained and recirculated on the work piece and cutting tools during the operation of the machine. The bed is enlarged intermediate of its ends as indicated at 12 to support the chuck work drive housing 13. At each side of the housing the spaced ways on top of the bed carry the right hand turret carriage 14 and the left hand turret carriage 15. Each of these carriages are moved along the ways by their respective feed screws 16 and 17 which in turn are driven through beveled gears mounted in the housings 18 and 19 having the transversely disposed shafts 20 and 21 extending out opposite sides thereof. The shafts extending out the rear side of the housings have the clutches 22 and 23 mounted thereon and arranged to engage their counterpart which is connected to the stub shafts of the gear reducers 24 and 25. Each gear reducer is connected through the reversing gear structure 26 and 27 to the main feed shaft 28 which extends the full length of the bed 10 and is carried in bearings mounted on the rear side of the machine. The main feed shaft 28 is driven by the chain 29 connected to a sprocket on the shaft 30, which in turn is driven by the belt chains from the forward drive motor 32 or the reverse drive motor 33. The motor 32 is preferably designed to operate at a speed of 1200 R. P. M., whereas the reverse drive motor 33 operates at 600 R. P. M. and their switches are preferably interlocked to prevent energization of both motors at the same time.

The ends of the transversely disposed shafts 20 and 21, which extend out of the front of the beveled gear housings 18 and 19, are connected through pulleys and belts to the motors 34 and 35 which are employed to rapidly traverse their respective turret carriages 14 and 15 in either direction along the ways of the machine bed.

The chuck housing 13 in the middle of the machine rotatably supports a ring gear 36 which comprises a cylindrical ring with a radially disposed central flange having a widened head. The perimetral surface of the ring and radial surfaces of the flange adjacent thereto form the rotary and end thrust bearing surfaces of the ring gear which are journaled in mating bearing surfaces supported on annular seats of the split housing 13. The gear teeth are cut in the wide head on the radial flange. These gear teeth mesh with the idler gear 37 journaled in the rear of the housing 13 which in turn meshes with the pinion 38 on the drive shaft 30 that also carries the sprocket of the chain 29.

Thus the motors 32 and 33 provide the driving power for the ring gear 36 as well as the feed for both the right and left table carriages and when the reversing motor 33 is energized the reversing gears 26 and 27 may be automatically thrown at the same time to provide a forward feed of the turret tables when the ring gear 36 is rotating in the reverse direction.

The nose of the bomb case 40 is held by a chuck 41 comprising spaced chuck grips 42 clamped between parallel rings 43 that are detachably secured within a sleeve 44 having an inturned thrust and locating flange. The sleeve 44 carrying the chuck assembly 41 is slidably mounted in the bore of the ring gear 36 and seats against an inturned flange 45 to which it is bolted. When secured in place the axial center of the chuck grips is aligned with the axial center of the gear 36.

The inner or work engaging surface of the chuck grips 42 and the parallel rings 43 form a mating conical surface complementary to the nose of the bomb 40 for the purpose of gripping the latter to rotate it during the machining operations.

Between the chuck housing 13 and the right hand turret carriage 14 the ways of the bed carry the steady rest carriage 46 which carries a housing provided with two sets of convergingly faced roller bearings 47 that rotatably support the grip ring 48 the inner perimetral surface of which mates with the tail of the bomb case 40 inwardly adjacent the end thereof. The conically shaped bore of the steady rest ring 48 faces the conical throat of the chuck 41.

The bomb 40 is transported to the machine tool on a conveyer. A gate is lowered and the bomb is rolled onto the rails of the track carriage 50 lying transversely of the bed ways between the chuck 41 and the steady rest 46. As the bomb rolls along the track to the axial center of the chuck, it drops into the center notch or cradle 51 in the rails in which position the axial center of the bomb is approximately one-eighth inch below the axial center of the chuck 41 and the ring 48. The rapid traverse motor 34 is then energized to move the right turret carriage 14 to the left. When the pin 52 in the front of the carriage 14 is pushed in it engages the end of the rod 53 projecting from the steady rest carriage 46. The steady rest cariage 46 is then moved along the ways to the left by the turret carriage 14 toward the bomb. The tail ring 48 then slides over and picks up the tail of the bomb and at the same time a shoulder on the push rod 54 fastened to the front of the steady rest carriage 46 picks up the track carriage 50. Thus all three carriages and the bomb case 40 are moved to the left by the rapid traverse motor 34.

When the nose of the bomb enters the throat of the gripping chuck 41 the front of the bomb is lifted from the rails of the track carriage 50 and the bomb is forced home by the rapid traverse movement. A friction clutch in the bevel gear housing 18 is set to slip at a selected pressure which determines the force with which the bomb is seated between the nose chuck 41 and the steady rest tail ring 48. This force may be as much as fifteen thousand pounds and may be varied by adjusting pressure at which the clutch will slip.

A pair of tie rods 55 hinged to the chuck housing 13, and joined adjacent their outer ends by a yoke 56, are permitted to drop into place with their heads in the upwardly open sockets 57. The hand nuts 58 on each side of the steady rest housing are then rotated to draw the sockets 57 against the heads of the tie rods 55 and thus securely lock the bomb in position.

The turret carriage 14 is then retracted. The end of the gauge 60 on the steady rest carriage 46 then determines the setting of the turret carriage feed trip block 61.

The steady rest housing 46 and the chuck housing 13 carry guide sleeves 62 and 63 respectively which are axially disposed relative to the bomb for the purpose of supporting closely adjacent the work each of the tools. A cylindrical gauge is inserted in the guide sleeve 63 of the chuck housing to determine the distance between the end of the bomb nose and the outer end of the guide sleeve 63. The operator then adjusts the left turret feed trip block 64 by the reading of this gauge which is then removed.

The turret 65 of the carriage 15 may be provided with one or more tools such as the drilling and boring tool 66, the facing and undercutting tool 67 and the tap 68 as shown in Fig. 1. The facing and undercutting tool 67 may be combined with the drilling and boring tool as shown at 66 in Fig. 3. The turret 65 is rotatably supported on the carriage 15 and is held on center by the centrally disposed vertical post or shaft 70, the head of which engages the under face of the carriage 15 but is free to turn with the turret. The upper end of the shaft 70 is threaded to receive the clamping nut 71 which when tightened holds the turret in position on the carriage 15.

The boring tool 66 is mounted on the head 72 which fits the bore of the guiding sleeve 63 and steadies the tool during the boring operation. The tool head 72 is mounted on the enlarged end of the boring shaft 73 journaled in and passing through the turret 65. The turret post 70 is provided with a clearance hole to receive the boring shaft 73. The other end of the shaft 73 is provided with a fluid connection 74, for conveying cutting fluid through the shaft to the tool head. A clutch 75 is arranged for connecting and disconnecting the shaft 73 to the stub shaft extending out of the gear reducing mechanism 76 supported on the turret carriage 15 which mechanism is driven by the motor 77. The boring shaft 73 is hollow to receive a bolt that holds the boring tool assembly 66 in place and to convey lubricant from the fluid connection 74 to the boring tool head during the cutting operation.

When the turret 65 is set in the boring position and the clutch 75 is connected the motor 77 is energized to rotate the combined drill and boring tool 66 in the direction opposite to that of the rotation of the bomb, thus multiplying the speed of the tool relative to the work. It may take approximately two minutes to drill, bore, face and undercut the solid nose of a moderate size bomb. The feed is then thrown in and the feed screw 17 moves the carriage 15 forward until the trip post 78 on the carriage strikes the previously set feed trip block 64 to stop the feed at the end of the cutting stroke, permitting the operator to energize the rapid traverse motor 35 to withdraw the turret carriage 15 and disengage the clutch 75 to free the shaft 73 and permit the turret 65 to be rotated to another operating position.

While the drilling and boring tool is in operation the rough boring and facing tool 80 carried by the turret 81 on the right hand turret carriage 14 is fed to the left for the purpose of machining the tail of the bomb. The previously adjusted feed stop block 61 is tripped by the post 82 on the carriage 14 to stop this feed. The operator then energizes the rapid traverse motor 34 to retract the turret carriage 14 and swing the boring finishing tool 83 into position and start the feed. When this machining operation is completed the post 82 again trips the stop block 61 cutting out the feed and permitting the carriage to be withdrawn.

Ordinarily these two boring and facing operations can be accomplished at the same time the nose is drilled bored and faced, since the nose is solid and the tail has a previously formed opening. Both turrets are then swung and set to tap the bores of the nose and the tail of the bomb. The speed and the direction of rotation of the bomb is proper for tapping the nose but not the tail. Thus the rough and finish boring and facing of the tail may take a longer period of time without hindering the production time.

The bomb nose tap 79 on the turret 65 is then set in position and the rate of feeding is changed in the ordinary way. The tap is adjusted to complete the tapping operation approximately one-sixteenth of an inch before the post 78 strikes the feed stop block 64. When the disk on the tap strikes the finished nose of the bomb the tap members collapse but the carriage moves ahead until the trip stops the feed. The carriage is then reversed by the rapid traverse motor and the machining of the nose of the bomb has been completed.

In order to tap the bore in the tail of the bomb it is necessary to reverse the direction of rotation of the bomb. This is accomplished by deenergizing the main drive motor 32 and energizing the reverse drive motor 33 which rotates the bomb in the opposite direction. This also reverses the feed so the reversing mechanism 26 and 27 is shifted to provide a forward feed.

The turret 81 on the right hand carriage 14 is rotated to place the tap 84 in its cutting position. The carriage is then rapidly advanced and the pin 52 is withdrawn to allow its inner end to pass the end of the rod 53, permitting the tap to enter the bored hole. A slot 85 is cut in the side of the rod 53 to permit the inner end of the pin 52 to engage therein for the purpose of withdrawing the steady rest carriage when the machining operations have been completed.

As the tap 84 advances a thread is cut in the bore of the tail of the bomb. When the disk of the tap strikes the finished end of the bomb the tap collapses and the carriage moves another sixteenth of an inch, at which time the pin 82 strikes the feed trip block 61 and stops the feed. The main drive motor 33 is then stopped and the turret carriage 14 is withdrawn and stopped when the pin 52 is about to engage the shoulder formed by the slot 85 in the rod 53. In this position the tap assembly is clear of the bomb tail.

The tie rods 55 are then loosened and swung vertically, thereby unlocking the steady rest carriage 46. Further retraction of the turret carriage 14 causes the pin 52 to pick up the steady rest carriage 46, withdrawing the grip ring 48 from the tail of the bomb. When the bomb is free of the grip ring the tail end drops onto the rail of the track 50. This slight drop of the tail through a small arc is sufficient to permit the nose of the bomb to pivot on the lower grip members 42 of the chuck 41 and swing clear of the upper grip members. Further retraction of the turret carriage 14 and the steady rest carriage 46 draws the push rod 54 through the opening in the track carriage 50 until the tail of the bomb is free of the steady rest, at which time the nut 86 on the rod 54 picks up the track carriage 50, and the bomb resting on one rail thereof is pulled free of the chuck 41 and the housing 13. The pin 52 is then withdrawn to uncouple the turret carriage 14 from the steady rest carriage when the bomb track carriage is aligned with the track 87 of the bomb tilting mechanism 88 which sets in the drip pan 11 to the rear of the machine. A considerable amount of lubricant is flooded in the nose and the tail during the machining operations which stays inside of the bomb casing. The bomb is rolled out of the notches 51 in the rails of the track carriage 50 and onto the track 87 which is preferably lower and has a slight slant. A shoulder 89 is formed on the track 87 to stop the bomb when the finished end of the tail is aligned with the turned up step 90 on the rocker 91. The track 87 lies transversely of and is bolted to the rocker 91 which is made of two sectors connected together at their ends forming a unitary rocking frame. The under face of the rockers have a channel formed therein permitting them to ride on spaced disk rollers 92. A link 93 is pivotally connected at one end to the rocker and at its other end to the crank arm 94 which is secured to the end of the shaft 95 that is journaled in the bed 10 and passes through to the front thereof where the hand lever 96 is secured thereto. By moving the hand lever 96 in a counterclockwise direction the rocker 91 rolls on the spaced rollers, thereby tilting the bomb. The finished face of the bomb tail rests on the step 90 thus preventing the bomb from sliding off the rails 87. The dotted lines of Fig. 5 illustrate the pitch of the bomb when tilted. The lubricant is thus permitted to spill out of the bomb into the pan 11 where it is cleaned and recirculated.

The bomb is then returned to its horizontal position by swinging the lever 96 back to the position shown in full lines and is then rolled over the shoulder 89 and off the track 87 onto a conveyor.

The operations of the several motors may be automatic in conjunction with the sequence of machine operating steps and each motor may be operated independently by push buttons. Standard lathe parts such as the feed trip and reversal of the rapid traverse motors are employed in this machine tool. With this machine a high rate of production may be obtained in machining work pieces such as bomb cases.

I claim:

1. A machine tool having a chucking mechanism for supporting a work piece tapered at both ends comprising a machine bed, spaced housings open at each end and supported on the machine bed to have relative movement toward and away from each other, axially aligned means carried by the housings arranged to encircle the work piece part way up the tapered ends and permit machining of the work piece ends from the outer ends of the housings, a smooth work-engaging surface in one of said means, annularly spaced grips carried by the other of said means to grasp and hold the work piece, and means for moving the housings toward each other to pick up the tapered ends and rest them on the lower portion of both of the said means and upon further movement swing the work piece into axial alignment with said means; the work piece pivotally moving on the lower grip means as it is received in gripping engagement by the diametrically positioned grip means.

2. The structure of claim 1 characterized in that said axially aligned means are rotatably supported in their housings, and a drive for rotating the work piece through the annularly spaced grips.

3. The structure of claim 1 which also includes means for locking the housings relative to each other to maintain the work piece therebetween.

4. In a chucking mechanism for work pieces having tapered ends which comprises a machine bed, a stand on said bed, a tapered throat carried by said stand to receive one end of the work piece, a second stand, a tapered throat carried by the second stand and axially aligned with the first tapered throat for receiving the other end of the work piece, a cradle disposed intermediate of said stands for supporting the work piece, means for imparting movement to said stands relatively toward each other to pick up and clamp the work piece between said tapered throats, and tie rod means for locking and holding said stands in relative rigid relation with the work piece clamped therebetween.

5. In a machine tool the combination of a bed having longitudinally disposed ways thereon, a transverse housing intermediate of said ways, a chuck rotatably supported in said housing and arranged to grip and support a work piece adjacent one end thereof, a steady rest slidable on said ways arranged to rotatably support the work piece adjacent its other end, the ends of said work piece being exposed for machining, tools supported on said ways at each end of the mounted work piece and movable toward and away from the work piece, and common drive means for rotating said work piece and feeding said tools to simultaneously machine both ends of the work piece.

6. The structure of claim 5 which also includes means for reversing the common drive to change the direction of rotation of the work piece, and separate means for independently retaining a forward feed of said tools when the common drive means is reversed.

7. The structure of claim 5 which also includes clutch means for disengaging the tool feed, and rapid traverse means for quickly moving the tools toward and away from the work.

8. The structure of claim 5 in which the tools are supported on turrets revolvably mounted on carriages slidably mounted on the ways, and a rotary shaft journaled in and passing diametrically through one turret for revolving one of the tools to machine the work piece.

9. The structure of claim 5 in which the tools are supported on turrets revolvably mounted on carriages slidably mounted on the ways, a rotary shaft journaled in and passing diametrically through one of the turrets, and means carried by the carriage for revolving the shaft and tool in the direction opposite to the rotation of the work piece for increasing the working speed of the tool relative to the work piece.

10. In a lathe structure the combination of a bed, ways on the bed, a carriage slidably mounted on the ways and arranged to be fed toward and away from the work, a turret revolvably mounted on the carriage, a vertical center shaft for securing the turret to the carriage, a horizontal shaft journaled in the turret and passing diametrically through the turret and the vertical center shaft, a tool mounted on one end of the horizontal shaft, and means for revolving said horizontal shaft to operate the tool.

11. The structure of claim 10 wherein the means for revolving the horizontal shaft includes a clutch and drive means supported on the carriage.

12. The structure of claim 10 wherein the horizontal shaft is hollow to receive a bolt for supporting the tool on one end of the horizontal shaft, and a lubricant fluid connection on the other end of the shaft for supplying cutting lubricant to the tool.

13. In a machine tool for a hollow work piece the combination of a bed having longitudinally disposed ways, a mobile carriage slidably supported on said ways and having a transversely disposed track for carrying the hollow work piece, an immobile track disposed on one side of the ways and supported in substantially the same plane as the mobile track, means for moving the mobile track into alignment with the immobile track to permit transference of the work piece from one track to the other, and means for tilting the immobile track and the hollow work piece carried thereby for the purpose of discharging the contents of the tubular work piece.

14. The structure of claim 13 in which the immobile track is secured to rockers supported on spaced rollers.

15. The structure of claim 13 which also includes a step fixed relative to the immobile track for preventing the hollow work piece from sliding off the track when reclining in a tipped position.

16. In a machine tool the combination of a bed having longitudinally disposed ways, a stand supported on the bed transversely to the ways, a work piece track carriage on the ways adjacent the stand, a tool turret carriage on the ways, and a steady rest carriage on the ways between the track carriage and the tool turret carriage, means for moving the tool turret carriage in either direction, means on the turret carriage for detachably connecting it to the steady rest carriage to draw it away from the stand, and means connecting the steady rest carriage with the track carriage for moving the track carriage along the ways.

17. The structure of claim 16 wherein the connecting means between the carriages is provided with lost motion making the movement of one carriage effective through a given distance before the connected carriage is moved.

18. The structure of claim 16 which also includes opposed chuck means on the stand and the steady rest carriage for receiving and holding a work piece on the track carriage when the tool turret carriage moves the steady rest carriage toward the stand.

19. The structure of claim 16 which also includes opposed chuck means on the stand and the steady rest carriage for receiving and holding a work piece on the track carriage when the tool turret carriage moves the steady rest carriage toward the stand, and tie rods connecting the stand and the steady rest carriage for retaining the work piece clamped between the chuck members.

ROBERT L. HIBBARD.